US009886323B2

(12) United States Patent
Trowbridge

(10) Patent No.: US 9,886,323 B2
(45) Date of Patent: Feb. 6, 2018

(54) GRAPHICAL USER INTERFACE FOR MANAGING VIRTUAL MACHINES

(75) Inventor: David Stephen Trowbridge, Los Altos Hills, CA (US)

(73) Assignee: VMWARE, INC., Palo Alto, CA (US)

( * ) Notice: Subject to any disclaimer, the term of this patent is extended or adjusted under 35 U.S.C. 154(b) by 858 days.

(21) Appl. No.: 12/917,216

(22) Filed: Nov. 1, 2010

(65) Prior Publication Data

US 2012/0110514 A1     May 3, 2012

(51) Int. Cl.
*G06F 9/50*     (2006.01)
*G06F 9/48*     (2006.01)

(52) U.S. Cl.
CPC ............ *G06F 9/5077* (2013.01); *G06F 9/485* (2013.01)

(58) Field of Classification Search
CPC ............. G06F 9/45533; G06F 9/45558; G06F 2009/45591; G06F 3/0482; G06F 11/328; G06F 2201/84; G06F 11/3003
See application file for complete search history.

(56) References Cited

U.S. PATENT DOCUMENTS

| | | | | |
|---|---|---|---|---|
| 5,922,044 | A * | 7/1999 | Banthia | H04L 29/06 709/203 |
| 6,256,649 | B1 * | 7/2001 | Mackinlay et al. | 715/212 |
| 6,738,770 | B2 * | 5/2004 | Gorman | |
| 7,162,484 | B2 * | 1/2007 | Grobler et al. | |
| 7,577,722 | B1 * | 8/2009 | Khandekar | G06F 9/45558 709/220 |
| 7,603,670 | B1 * | 10/2009 | van Rietschote | 718/1 |
| 7,653,878 | B1 * | 1/2010 | Russell | 715/748 |
| 8,209,408 | B1 * | 6/2012 | Huang et al. | 709/223 |
| 8,276,078 | B2 * | 9/2012 | Yuasa | 715/732 |
| 8,875,128 | B2 * | 10/2014 | Elyashev | G06F 9/45533 709/223 |
| 9,378,121 | B2 * | 6/2016 | Timashev | G06F 9/44589 |
| 2002/0054169 | A1 * | 5/2002 | Richardson | 345/854 |
| 2003/0182358 | A1 * | 9/2003 | Rowley | G09B 5/12 709/203 |
| 2004/0168115 | A1 * | 8/2004 | Bauernschmidt et al. | 715/500 |
| 2004/0174392 | A1 * | 9/2004 | Bjoernsen et al. | 345/751 |
| 2006/0010433 | A1 * | 1/2006 | Neil | G06F 9/45533 717/138 |
| 2006/0224942 | A1 * | 10/2006 | Hidesawa et al. | 715/501.1 |
| 2007/0179955 | A1 * | 8/2007 | Croft et al. | 707/9 |
| 2007/0240071 | A1 * | 10/2007 | Sherrill et al. | 715/764 |
| 2008/0098309 | A1 * | 4/2008 | Fries et al. | 715/734 |

(Continued)

OTHER PUBLICATIONS

Microsoft, "System Center Virtual Machine Manager 2008 R2", Sep. 2009, pp. 1-98.*

*Primary Examiner* — Ryan Pitaro
(74) *Attorney, Agent, or Firm* — Thomas | Horstemeyer, LLP

(57) ABSTRACT

A graphical user interface (GUI) for managing virtual machines (VMs) that are running in one or more hosts provides a search interface that is intuitive and presents search results in a tree structure that lists or marks items that meet user-designated search criteria. User-designated search criteria include favorite VMs, powered-on VMs, VMs running in a specified host, and text-based search criteria. Both VMs that are running locally in a local host and VMs that are running remotely in a remote host are listed so long as they meet the user-designated search criteria and thus can be managed using the GUI.

24 Claims, 8 Drawing Sheets

(56) References Cited

U.S. PATENT DOCUMENTS

| | | | |
|---|---|---|---|
| 2008/0201709 A1* | 8/2008 | Hodges .......................... 718/1 | |
| 2009/0172666 A1* | 7/2009 | Yahalom .............. G06F 3/0605 | 718/1 |
| 2009/0198809 A1* | 8/2009 | Goto et al. .................... 709/223 | |
| 2009/0327071 A1* | 12/2009 | Kreft ........................ 705/14.49 | |
| 2010/0223309 A1* | 9/2010 | Benari .......................... 707/912 | |
| 2010/0269060 A1* | 10/2010 | Bandholz .............. G06F 3/0481 | 715/778 |
| 2010/0318931 A1* | 12/2010 | Boykin et al. ................ 715/771 | |
| 2011/0060998 A1* | 3/2011 | Schwartz et al. ............ 715/738 | |
| 2011/0126139 A1* | 5/2011 | Jeong ................... G06F 3/0482 | 715/767 |
| 2011/0209145 A1* | 8/2011 | Chen .................. G06F 9/45558 | 718/1 |
| 2012/0017114 A1* | 1/2012 | Timashev et al. ............. 714/15 | |
| 2012/0159483 A1* | 6/2012 | He et al. .......................... 718/1 | |
| 2012/0284713 A1* | 11/2012 | Ostermeyer ........ G06F 17/5009 | 718/1 |

* cited by examiner

GRAPHICAL USER INTERFACE FOR MANAGING VIRTUAL MACHINES

BACKGROUND

Virtual machines (VMs) are an increasingly popular technology for improving flexibility and efficiency in a range of computational systems. Certain VM systems are conventionally managed using a graphical user interface (GUI) application, which provides an intuitive visual interface for managing individual virtual machine instances. One example GUI known in the art is included in a product sold by VMware, Inc. of Palo Alto, Calif. as VMware Workstation. This product includes a sidebar containing a tree with two main top-level items, a "Powered On" list and a "Favorites" list. The "Powered On" list provides an inventory of virtual machines currently executing in the workstation and the "Favorites" list provides an inventory of virtual machines that the user has designated as a favorite. Thus, as virtual machines are powered on and off, they appear and disappear from the "Powered On" list. Similarly, virtual machines appear and disappear from the "Favorites" list as they are designated as a favorite or not.

Another GUI known in the art is included in a product sold by VMware, Inc. as vSphere Client. A sidebar with a tree view of certain objects is used to represent search results. However, the entire tree structure may change based on whether the user wants to organize by host, data store, network, etc. As a result, this GUI requires some training and experience before a user can navigate it with ease.

As VM systems grow to include a larger number of VM instances, conventional GUIs can quickly become unwieldy and inefficient in presenting information about individual VM instances. Therefore, what is needed in the art is a technique for presenting information about VM instances in a simple and intuitive manner while providing sufficient information so that virtual machines can be managed effectively.

SUMMARY

One or more embodiments of the present invention provide a GUI for managing VMs that are running in one or more hosts. The GUI exposes a search interface to the user that is intuitive and presents search results in a tree structure that lists or marks items that meet the user's designated search criteria. As compared to conventional GUIs, the GUI according to one or more embodiments of the invention is compact, easy to learn, and flexible.

A method according to an embodiment of the present invention generates a display list of VMs that include both VMs running locally in a local computer system and VMs running remotely in one or more remote computer systems. The method includes the steps of detecting a user input event that specifies a search criteria for VMs, generating a list of VMs that meet the specified search criteria, the VMs including one or more VMs that are running locally in the computer system and one or more VMs that are running remotely in the remote computer systems, and displaying the list of VMs in a GUI.

A method according to another embodiment of the present invention generates a display list of VMs in a GUI that includes VMs meeting two or more criteria. The method includes the steps of generating a list of VMs that meet a first criteria, wherein the list of VMs has a tree structure and each VM listing appears underneath a listing for a host in which the corresponding VM has been initialized, and displaying a marker on or near VM listings corresponding to VMs that meet a second criteria.

Further embodiments of the present invention include a non-transitory computer readable storage medium that stores instructions to be executed in a processing unit of a computer system, wherein the instructions when executed in the processing unit generates a GUI. The GUI includes a first list of VMs, each of which runs locally in the computer system, and a second list of VMs, each of which runs remotely in one or more remote computer systems. In addition, each list of VMs in the GUI has a tree structure, such that each VM listing appears underneath the computer system in which the corresponding VM has been initialized.

DETAILED DESCRIPTION

Figure 1A:
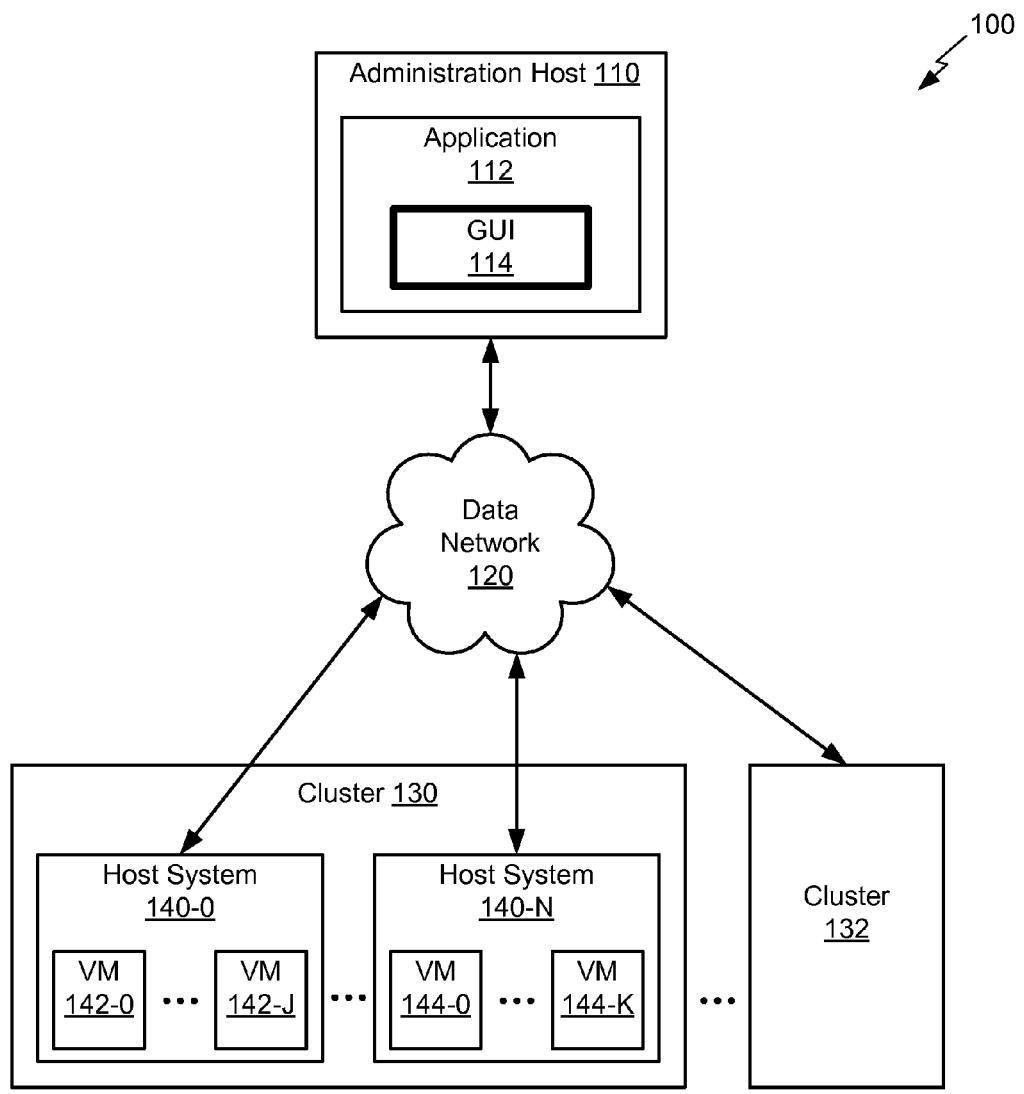
FIG. 1A illustrates a virtual machine system comprising an administration host configured to manage virtual machines executing on plural hosts, according to one embodiment of the present invention.

FIG. 1A illustrates a virtual machine system 100 comprising an administration host 110 configured to manage virtual machines 142, 144 executing on plural hosts 140, according to one embodiment of the present invention. The virtual machine system 100 comprises the administration host 110, a data network 120, and cluster 130. The administration host 110 includes a management application 112 configured to facilitate management of the virtual machines (VMs) 142, 144. The administration host 110 is coupled to the cluster 130 via data network 120. Data network 120 may comprise any technically feasible networking system. For example, data network 120 may implement an industry standard Ethernet switched network, internet protocol (IP)

routed network, or any combination thereof. Alternately, the data network 120 may implement a Fibre Channel switched network.

Cluster 130 comprises one or more host systems 140, configured to execute VMs 142, 144. It should be noted that in the description provided herein an element that has multiple instances (e.g., N), such as host system 140, is referred to individually as 140-*i* (where i is any one of 1 to N) and collectively as 140. As shown, host system 140-0 is configured to execute VMs 142-0 through 142-J, while host system 140-N is configured to execute VMs 144-0 through 144-K. The virtual machine system 100 may also include additional clusters, such as cluster 132, which is structured substantially identically to cluster 130. Each host system 140 may comprise a computation platform, such as a general-purpose computer system. Each host system 140 may include local mass storage, networked mass storage, or a combination thereof based on specific implementation requirements.

The management application 112 is configured to communicate with host systems 140 via data network 120 to configure, manage, and interact with VMs 142, 144. For example, management application 112 can instruct a specific VM to turn on, turn off, and pause execution. Management application 112 can also connect to a particular VM to enable a user to interact with a guest operating system (OS) and guest applications executing within the VM. The graphical user interface (GUI) module 114 provides specific tools, detailed in greater detail below in FIGS. 2A-2F, and 3, for selecting one or more VMs from VMs 142-0 through 144-K, and for accepting management commands from the user for the selected VMs.

Figure 1B:
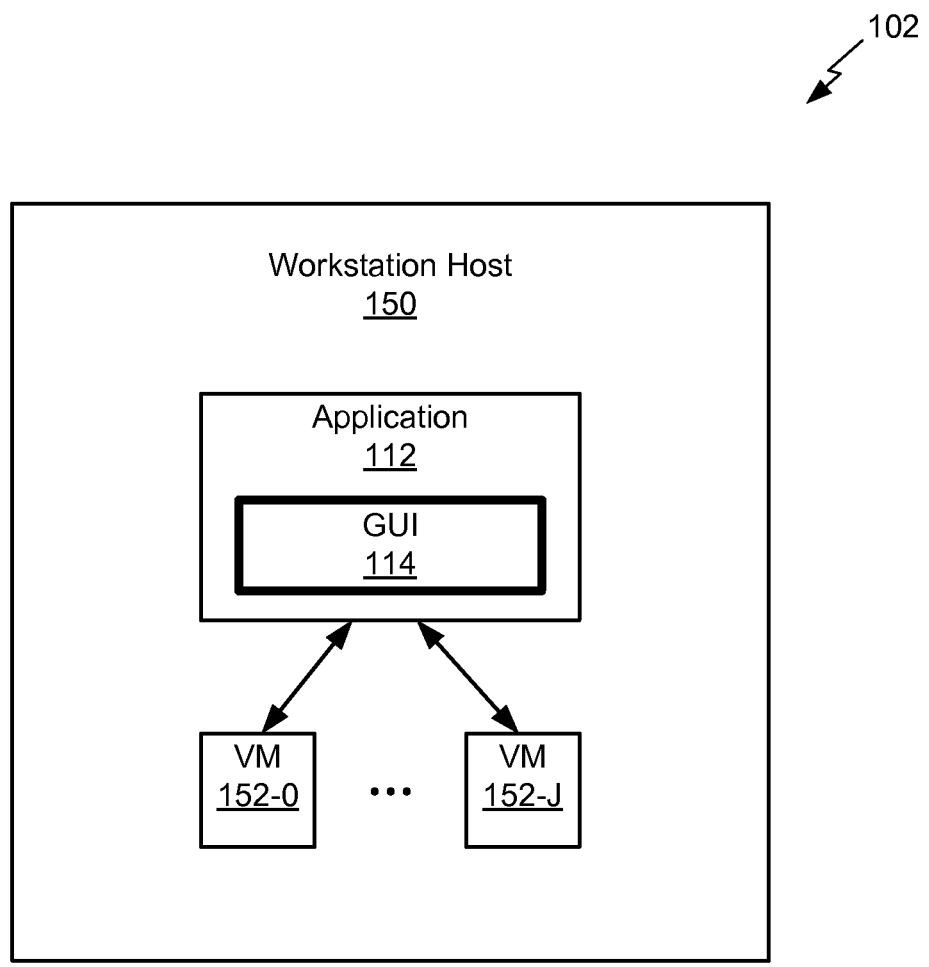
FIG. 1B illustrates a virtual machine system comprising a workstation host configured to manage virtual machines executing on the workstation host, according to one embodiment of the present invention.

FIG. 1B illustrates a virtual machine system 102 comprising a workstation host 150 configured to manage virtual machines 152 executing on the workstation host 152, according to one embodiment of the present invention. The workstation host 150 includes application 112, which manages VMs 152. As described previously in FIG. 1A, the application 112 includes GUI module 114, which provides a GUI for managing the VMs 152.

Figure 2A:
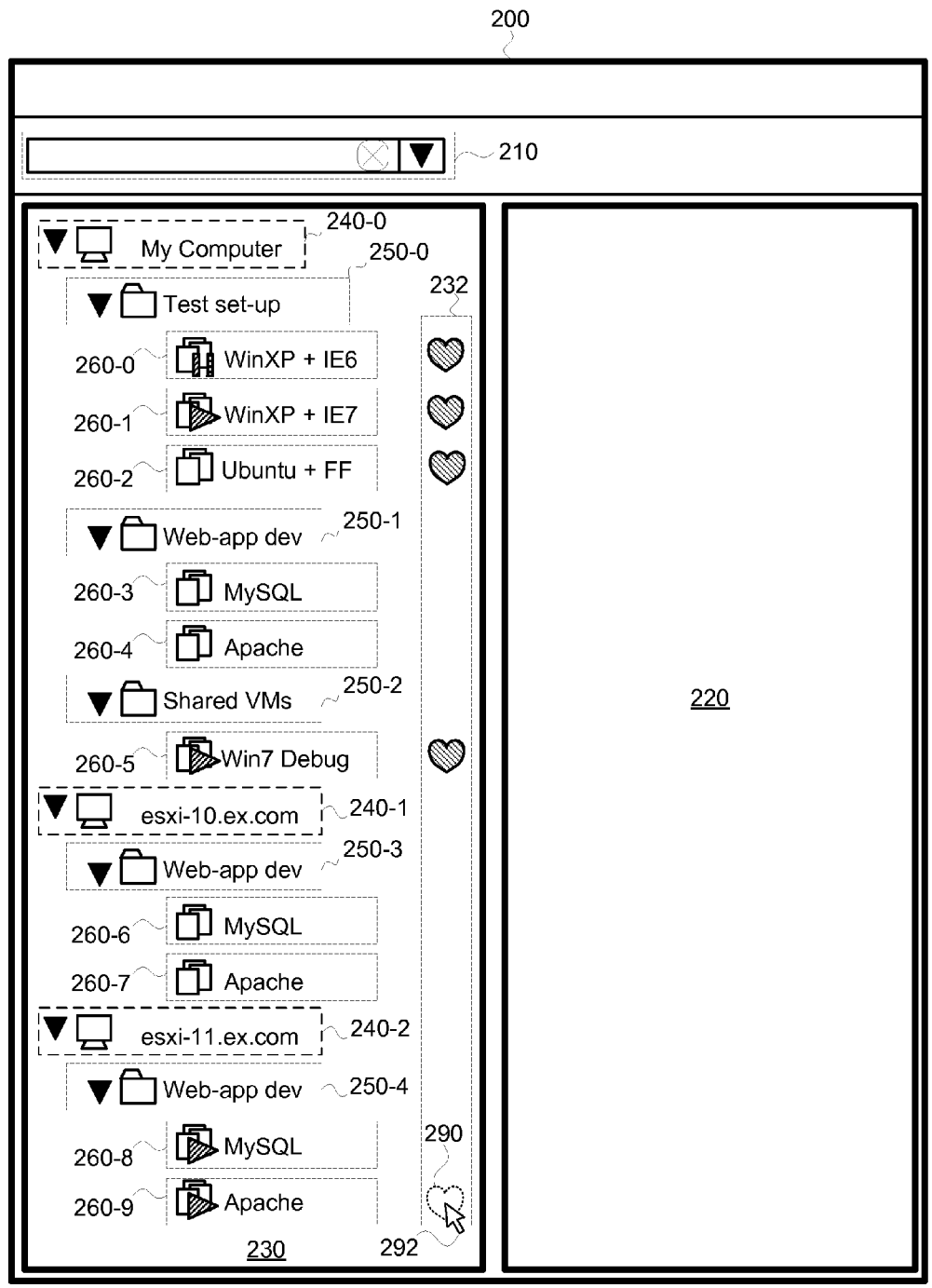
FIG. 2A illustrates a graphical user interface for searching and managing virtual machines, according to one embodiment of the present invention.

FIG. 2A illustrates a GUI 200 for searching and managing VMs, according to one embodiment of the present invention. GUI 200 is generated by GUI module 114 shown in FIG. 1. GUI 200 includes a search element 210, a list panel 230, and a VM panel 220. Search element 210 enables the user to enter specific search criteria for listing VMs in list panel 230. List panel 230 displays a list of hosts and associated VMs configured to execute on hosts 240. VM panel 220 provides a portal to a specified VM 260. The user may interact with a guest OS and guest applications executing within the specified VM 260 via VM panel 220. For example, the user may connect to the guest OS, resulting in a frame buffer for the guest OS being displayed within VM panel 220. The user may transmit GUI events, such as mouse movements and key presses to the guest OS, which should then react appropriately to the GUI events. In this way, the user is able to interact with the specified VM.

As shown, list panel 230 displays a list of hosts 240 and individual VMs 260 organized into folders within hosts 240-*i*. Individual VMs 260 are configured to nominally reside within a specified host 240, although migration of VMs 260 between hosts 240 may also be implemented without departing the scope of the present invention. It should be recognized that each of hosts 240 displayed in GUI 200 corresponds to one of host systems 140 of FIG. 1.

A set of favorites 232 is associated with certain designated VMs 260 within list panel 230. Each VM 260 may be designated as a favorite by the user. After being designated as a favorite, the corresponding VM may be listed with an accompanying icon, such as a heart icon, to signify that it is a favorite. As further described below, a favorite designation provides one attribute for searching and listing VMs 260. A user may remove a favorite designation from a particular VM 260 by clicking on the corresponding favorite attribute icon. The user may add a favorite designation to a particular VM 260 by clicking in a region that corresponds to the region otherwise occupied by a favorite attribute icon. To assist the user in easily locating the region corresponding to a particular VM 260, an indication is generated when the user hovers a mouse cursor 292 over the region. In one embodiment, the indication comprises an outline of the favorite attribute icon. For example, if the user hovers the mouse cursor 292 over the intersecting region of the column of favorites 232 and the row corresponding to VM 260-9, an outline of the heart icon 290 is displayed while the cursor 292 hovers over the region. If the user clicks on the region while the outline of the heart icon 290 is displayed, then VM 260-9 is designated a favorite and a heart icon is displayed next to VM 260-9.

Each host 240, folder 250, and VM 260 is represented in the GUI 200 using both an icon and a text descriptor. For example, host 240-0 is represented using an icon, text descriptor "My Computer." Similarly, VM 260-0 is represented using an icon and text descriptor "WinXP+IE6." Each host 240 and folder 250 representation also includes a corresponding expansion tool, indicated here by a tip-down black triangle. The expansion tool is used to toggle between listing and not listing contained items. For example, the expansion tool is used to list or not list folders 250 within each host 240. Similarly, the expansion tool is used to list or not list VMs 260 within each folder 250.

Figure 2B:
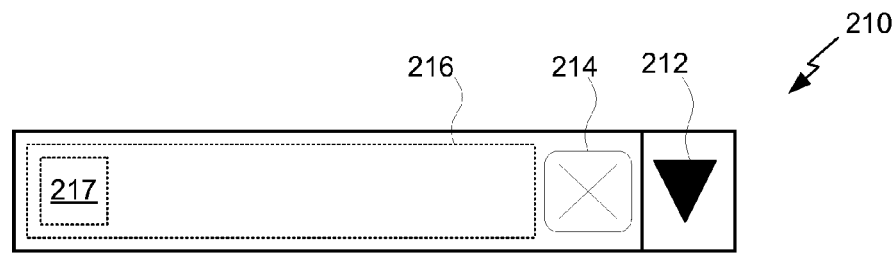
FIG. 2B is a detail of a search element within the graphical user interface configured to receive text search strings and to present a shortcut list of search targets, according to one embodiment of the present invention.
Figure 2C:
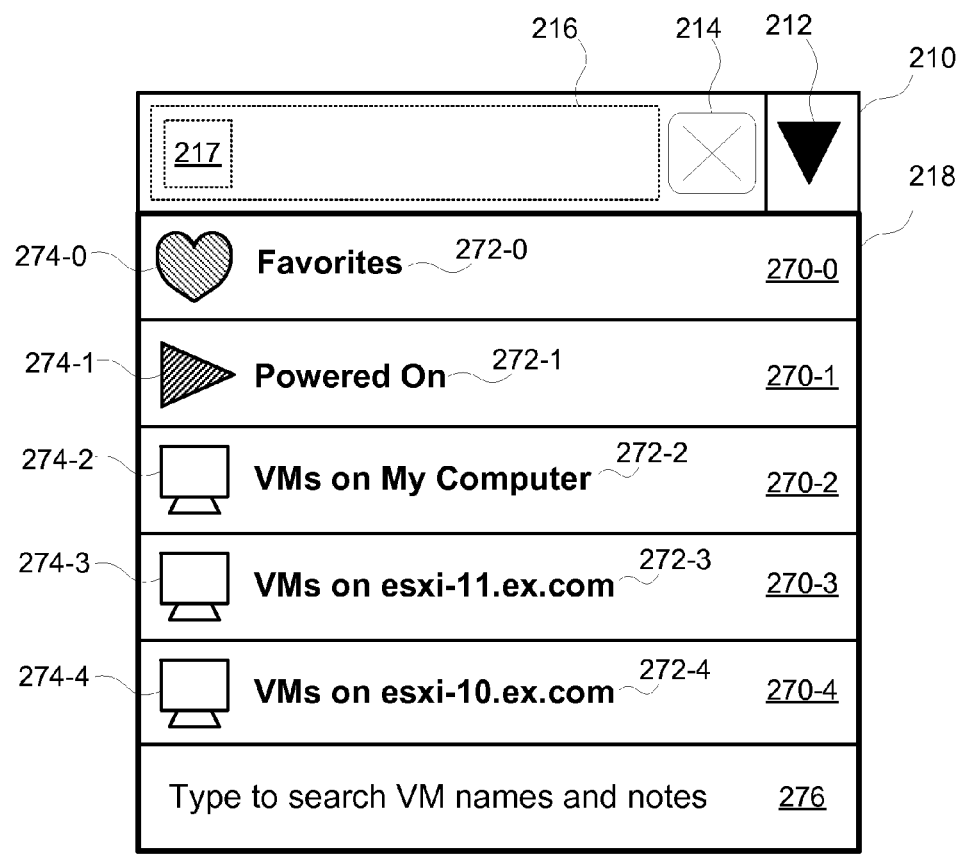
FIG. 2C is a detail of the search element within graphical user interface illustrating an exemplary list of shortcut search targets, according to one embodiment of the present invention.

FIG. 2B is a detail of search element 210 within GUI 200 configured to receive text search strings and to present a shortcut list of search targets, according to one embodiment of the present invention. Search element 210 includes a text entry field 216, a clear tool 214, and an expansion tool 212. Text entry field 216 is configured to receive one or more text strings that the user may enter. A search indicator icon 217, described in greater detail below in FIG. 2C, is positioned within the search element 210 to indicate if a search is currently active. Clear tool 214 clears text entry field 216 and clears related search data from being listed, for example, in list panel 230. Expansion tool 212 toggles between displaying and not displaying a list shortcut of search targets, as illustrated below in FIG. 2C.

FIG. 2C is a detail of the search element within graphical user interface illustrating an exemplary list of shortcut search targets 218, according to one embodiment of the present invention. If the user generates a mouse click on the expansion tool 212 while the list of shortcut search targets 218 is being displayed, then the list is hidden. If the user generates a mouse click on the expansion tool 212 while the list of shortcut search targets 218 is not being displayed, then the list of shortcut search targets 218 is then displayed.

As shown, the list of shortcut search targets 218 includes plural shortcut searches 270. For example, 270-0 is a shortcut search to display a list of VMs 260 that are each designated as a favorite. The action of shortcut search 270-0 is indicated by the favorite (heart) icon 274-0, and text descriptor "Favorites" 272-0. The action of shortcut search 270-1 is indicated by a powered-on icon 274-1, and text descriptor "Powered On" 272-1. Similarly, each shortcut search 270-2 through 270-4 includes a corresponding icon 274, and text descriptor 272. A notification 276 informs the user that they may type a search string into text field 216 to search VM names and notes.

The search indicator icon 217 displays one specific icon from icons 274-0 through 274-4 to indicate the search corresponding to the one specific icon 274 is the active search result being displayed. Certain shortcut search items 270 within the list of shortcut search targets 218 are color-coded. When a given shortcut search item 270 is the active search result being displayed, the corresponding color-coding color for the shortcut search item 270 is used to color code at least a portion of the search element 210. For example, if the favorites shortcut search item 270-0 is color-coded as pink, then the region corresponding to the favorites shortcut search item 270-0 is shaded pink. Furthermore, if the favorites shortcut search is the active search result being displayed, then the search element 210 is also color-coded pink to indicate that the active search result being displayed is for the favorites shortcut search. In this way, the user is provided with a visual cue regarding the active search result being displayed.

Figure 2D:
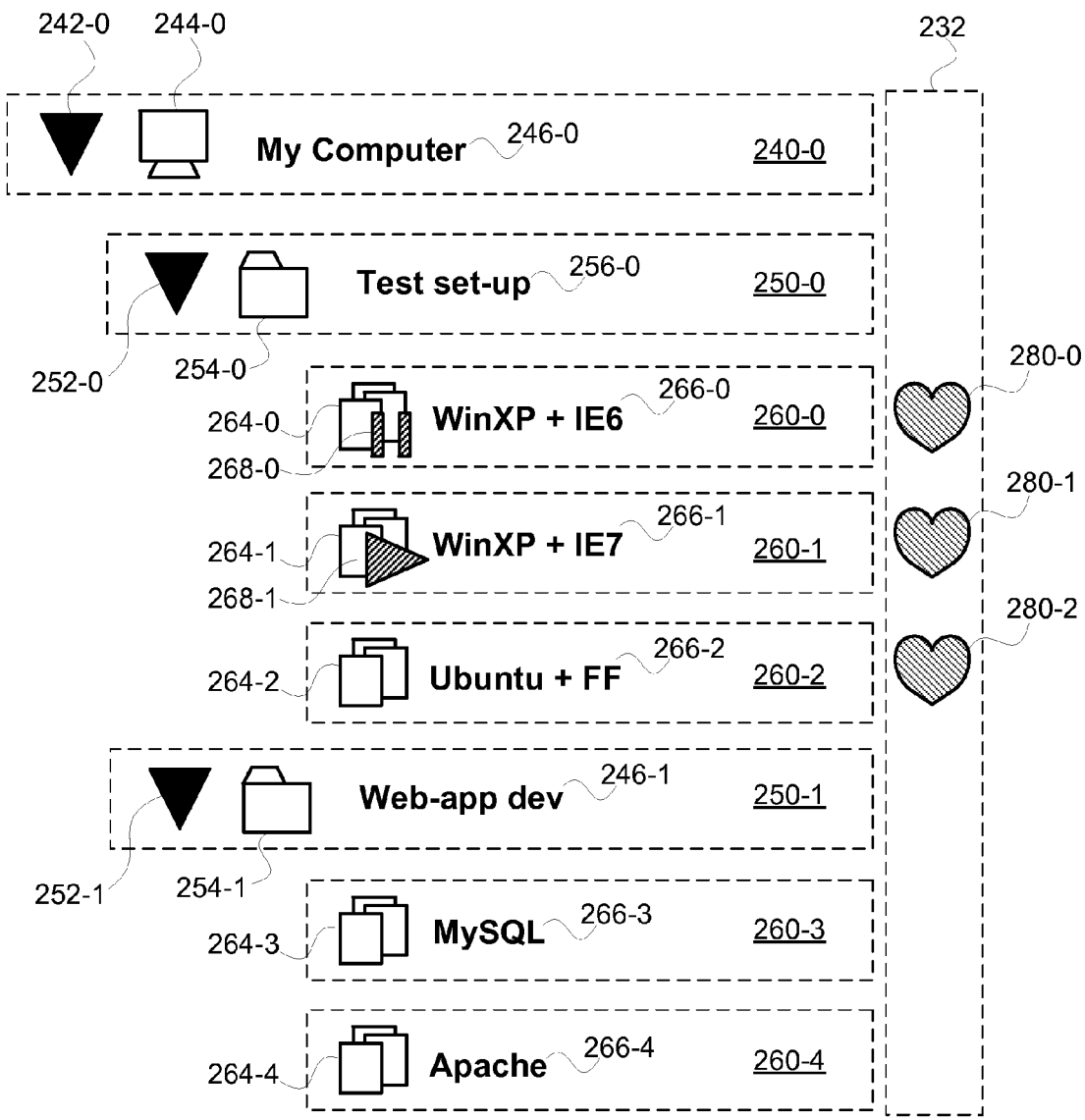
FIG. 2D is a detail of the graphical user interface illustrating a list of virtual machines, according to one embodiment of the present invention.

FIG. 2D is a detail of the GUI 200 illustrating a list of virtual machines 260, according to one embodiment of the present invention. The detail illustrates a listing for host 240-0. Host 240-0 is designated by icon 244-0 and text descriptor 246-0. Expansion tool 242-0 enables the user to either display or not display items related to host 240-0. Specifically, expansion tool 242-0 causes folders 256-0 and 256-1 residing within host 240-0, along with VMs 260-0 through 260-4, to either be displayed or not displayed. Folder 250-0 is designated by icon 254-0 and text descriptor 256-0. Expansion tool 252-0 enables the user to either display or not display VMs 260-0 through 260-2, contained within folder 250-0. Similarly, expansion tool 252-1 enables the user to either display or not display VMs 260-3 through 260-4, contained within folder 250-1.

Each VM 260 is represented by a corresponding VM icon 264 and text descriptor 266. For example, VM 260-0 is represented by VM icon 264-0 and text descriptor 266-0. Each VM icon 264-0 may include an overlay icon 268 that indicates state information about the corresponding VM 260. A pause icon, shown as 268-0 indicates VM 260-0 is powered on, but in a halted state. A powered on icon 268-1 indicates VM 260-1 is powered on and running. A VM icon 264 with no overlay icon 268 indicates that the corresponding VM 260 is powered off. For example VM icon 264-2 has no overlay icon 268, indicating VM 260-2 is powered off.

Favorite icons 280 associated with individual VMs 260 indicate that the corresponding VM 260 has been designated a favorite by the user, and the corresponding VM 260 includes a search attribute of favorite. As shown, VMs 260-0, 260-1, 260-2 are designated favorites via favorite icons 280-0, 280-1, and 280-2, respectively. VMs 260-3 and 260-4 are not favorites and will not appear in a search for favorites.

Figure 2E:
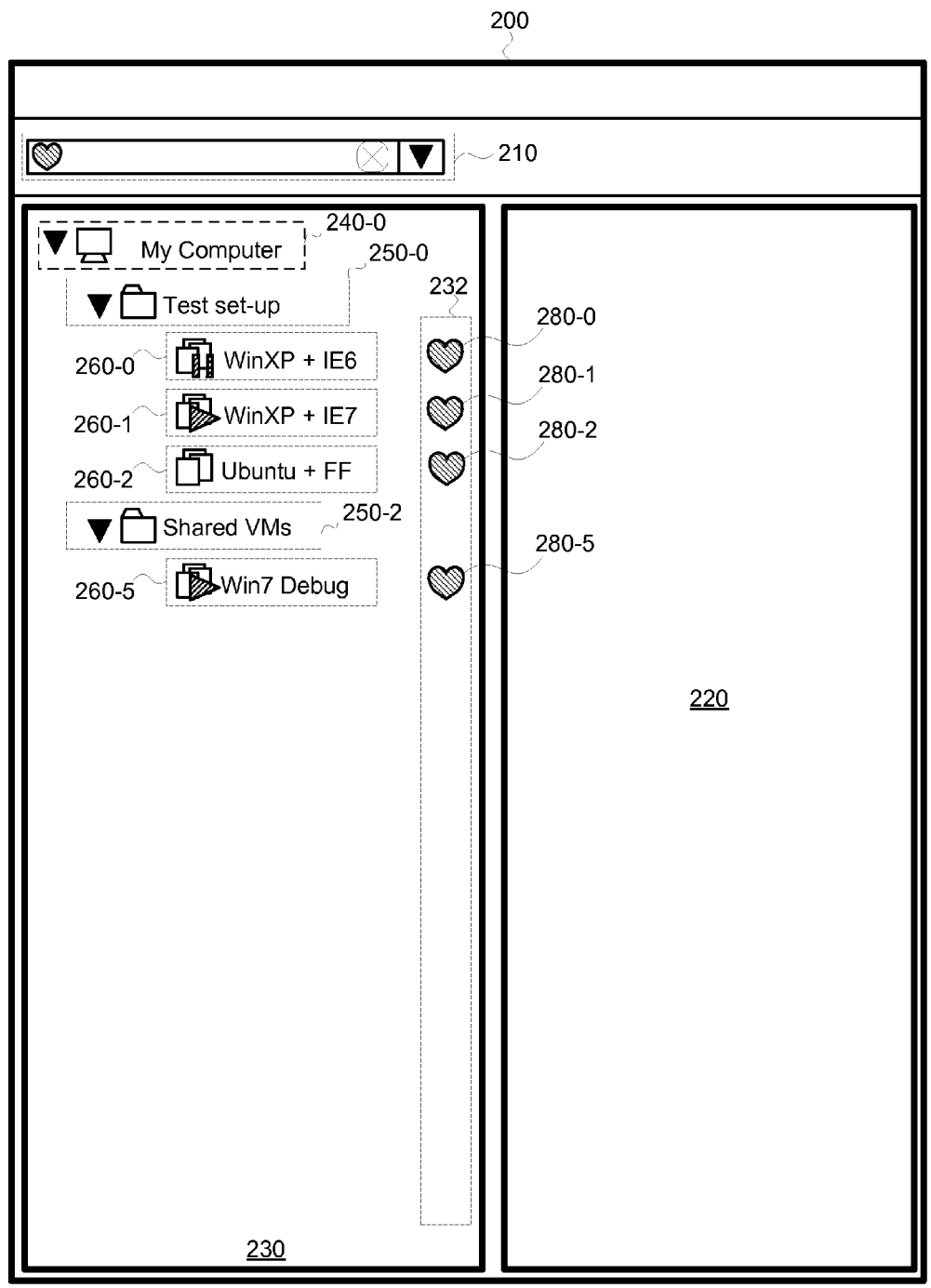
FIG. 2E illustrates a graphical user interface displaying search results for virtual machines designated as favorites, according to one embodiment of the present invention.

FIG. 2E illustrates GUI 200 displaying search results for VMs designated as favorites, according to one embodiment of the present invention. As shown, only VMs 260 having a favorite attribute are shown in these search results. The favorite attribute is indicated by favorite icons 280-0 through 280-5. The search results are obtained when the user selects favorites shortcut search 270-0 from the list of shortcut search targets 218.

Figure 2F:
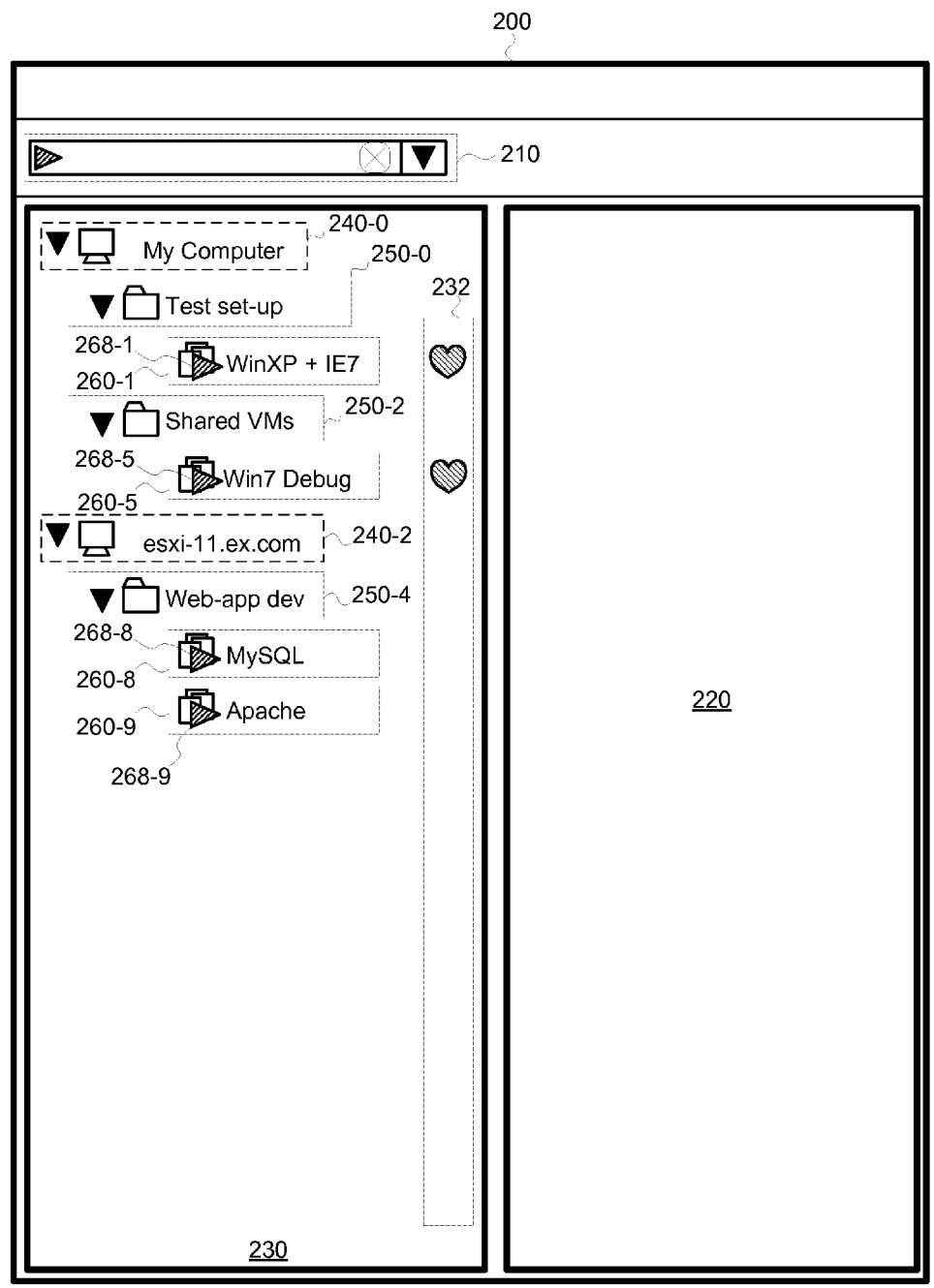
FIG. 2F illustrates a graphical user interface displaying search results for virtual machines that are powered on, according to one embodiment of the present invention.

FIG. 2F illustrates GUI 200 displaying search results for VMs that are powered on, according to one embodiment of the present invention. As shown, only VMs 260 that are powered on are shown in these search results. Each VM 260 is indicated as being in a powered on state by powered on icons 268. The search results are obtained when the user selects powered on shortcut search 270-1 from the list of shortcut search targets 218.

Figure 3:
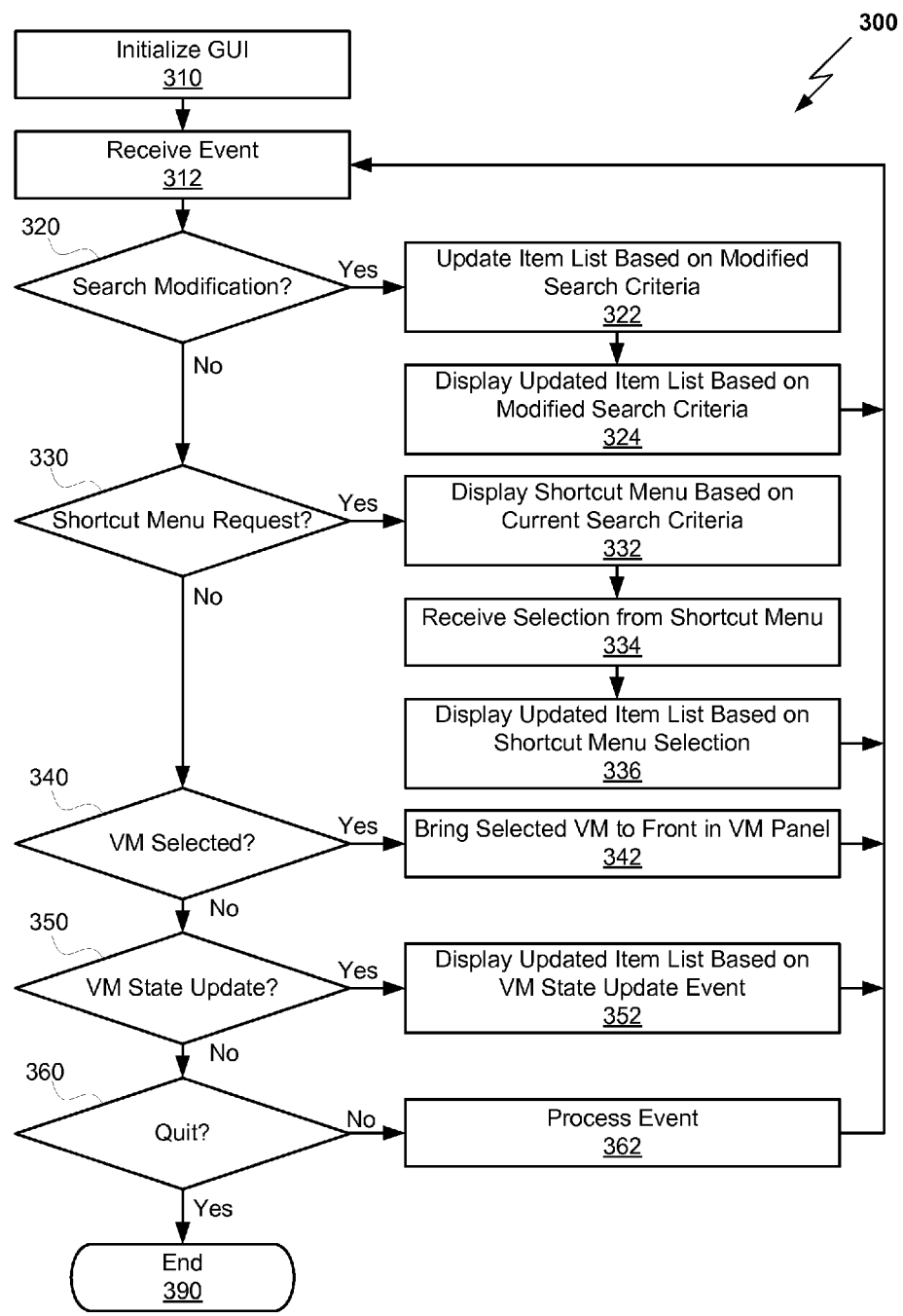
FIG. 3 is a flow diagram of method steps, performed by a graphical user interface module within a management application, for searching and managing virtual machine instances, according to one embodiment of the present invention.

FIG. 3 is a flow diagram of method steps 300, performed by GUI module 114 within management application 112 of FIG. 1, for searching and managing VMs 142, 144, according to one embodiment of the present invention. Although the method steps are described in conjunction with the system of FIG. 1, it should be understood that there are other systems in which method steps may be carried out.

The method begins in step 310, where the GUI is initialized. This step may occur, when the VM management application is launched and GUI module 114 is initialized. This step includes clearing search criteria and setting the list of shortcut search targets 218 to include favorite VMs and powered-on VMs. Optionally, additional shortcut search items may be included at initialization. For example, local VMs and VMs on a pre-selected list of hosts may also be included.

In step 312, GUI module 114 detects an event. The event may be a VM state update event, in which state information for one or more VMs is updated. For example, a VM may go from powered-on to powered-off. The event may also be a user input event in the form of an entered text string or a mouse click requiring action by GUI module 114, such as a mouse click. If, in step 320, the event is a user input event for a search modification, then the method proceeds to step 322. A search modification may include any technically feasible type of search modification. For example, the search modification may comprise entry of a text string within text entry field 216. In step 322, GUI module 114 updates an item list based on the modification to the search criteria. In step 324, GUI module 114 displays an updated item list based on the modified search criteria in list panel 230. The item list includes a list of hosts 240, related folders 250, and matching VMs 260. Upon displaying the updated item list, the method proceeds back to step 312.

Returning to step 320, if the event is not a user input event for a search modification, then the method proceeds to step 330. If, in step 330, the event is a user input event for a shortcut menu request, then the method proceeds to step 332. An example of a shortcut menu request is a mouse click on expansion tool 212 of FIG. 2B to request display of the list of shortcut search targets 218 of FIG. 2C. In step 332, GUI module 114 displays a shortcut menu comprising a list of shortcut search targets, such as the list of shortcut search targets 218. In step 334, GUI module 114 receives a selection from the shortcut menu for display. In step 336, GUI module 114 displays an updated item list based on the shortcut menu selection. The item list includes a list of hosts 240, related folders 250, and matching VMs 260. Upon displaying the updated item list, the method proceeds back to step 312.

Returning to step 330, if the event is not a user input event for a shortcut menu request, then the method proceeds to step 340. If, in step 340, the event comprises a user input event for selecting a VM 260 from the item list displayed in list panel 230, then the method proceeds to step 342. In step 342, GUI module 114 connects to the selected VM 260 and brings the VM to front in VM panel 220 of GUI 200. At this point, the user may interact with the VM 260 within VM panel 220. The method proceeds back to step 312. In one embodiment, the selected VM 260 remains active within VM panel 220 and executes concurrently with GUI module 114. If the selected VM 260 resides on a remote host, such as one of host systems 140, then GUI module 114 connects to the remote host using any technically feasible technique. Persons skilled in the art will recognize that certain connection techniques for remote hosts require user authentication, which is not described herein because authentication is independent of the present invention.

Returning to step 340, if the event does not comprise a user input event for selecting a VM 260 from the item list displayed in list panel 230, then the method proceeds to step 350. If, in step 350, the event is a VM state update event, then the method proceeds to step 352. In step 352, the GUI module 114 updates the item list based on the VM state update event.

Returning to step 350, if the event is not a VM state update event, then the method proceeds to step 360. If, in step 360, the event is not a request to quit the management application 112, then the method proceeds to step 362. In step 362, the GUI module 114 processes the event using any technically feasible technique and based on implementation specific requirements of the management application 112. It should be recognized that there are many different types and categories of events. For example, the GUI module 114 may detect an event indicating the mouse cursor 292 has started or stopped hovering over a region that now needs to be redrawn, as described in FIG. 2A with respect to the outline of the heart icon 290. Upon processing such an event in step 362, the method proceeds back to step 312.

Returning to step 360, if the user input event is a request to quit the management application 112, then the method terminates in step 390.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. In a computer system, a method for generating a display list of virtual machines (VMs) that include VMs running locally in the computer system and VMs running remotely in one or more remote computer systems, the method comprising:

detecting a user input event that specifies a search criteria for VMs, wherein detecting a user input event comprises receiving a search criteria selection at a search interface that includes a set of search targets;

generating a list of VMs that meet the specified search criteria, the VMs including one or more VMs that are running locally in the computer system and one or more VMs that are running remotely in the remote computer systems;

displaying the list of VMs in a graphical user interface, wherein each VM in the list of VMs is displayed with an indication of an associated host machine in which the corresponding VM has been initialized;

updating the displayed list of VMs based on a detected VM state update event;

detecting a second user input event that specifies a selected VM from the list of VMs; and displaying a second graphical user interface provided by an operating system of the selected VM, the second graphical user interface enabling the user to interact with the operating system of the selected VM.

2. The method of claim 1, wherein the specified search criteria is met by those VMs that have been designated as favorites.

3. The method of claim 1, wherein each VM in the list of VMs has one of the following: an associated icon indicating whether the corresponding VM is powered on or halted, or a lack of the associated icon indicating that the corresponding VM is powered off.

4. The method of claim 1, wherein the specified search criteria is met by those VMs that are powered on.

5. The method of claim 4, further comprising:
detecting a third user input event that pauses a second VM from the list of VMs; and
updating the graphical user interface so that the second VM that has been paused is displayed with a corresponding pause icon.

6. The method of claim 1, wherein the second graphical user interface is located in one of the following: a panel adjacent to the displayed list of VMs, or a panel below the displayed list of VMs.

7. The method of claim 6, wherein displaying the second graphical user interface comprises displaying a frame buffer for the operating system within the panel.

8. A method for generating a display list of virtual machines (VMs) in a graphical user interface that includes VMs meeting two or more criteria, the method comprising:
receiving a first criteria at a search interface that includes a set of search targets;
generating and displaying a list of VMs that meet the first criteria, wherein each VM in the list of VMs is displayed with an indication of an associated host machine in which the corresponding VM has been initialized;
updating the displayed list of VMs based on a detected VM state update event;
displaying a marker on or near VMs in the list of VMs that meet a second criteria;
selecting one VM from the VMs in the list of VMs that meet the second criteria; and
generating and displaying a second graphical user interface provided by an operating system of the selected one VM, the second graphical user interface enabling a user to interact with the operating system for the selected VM.

9. The method of claim 8, wherein the second criteria comprises whether or not a VM has been designated as a favorite.

10. The method of claim 9, further comprising:
detecting that a cursor is positioned next to a VM in the list of VMs at a position corresponding to a position of the marker;
displaying an outline of the marker;
detecting a mouse click event while the cursor is positioned on top of the outline of the marker; and
based on the detected mouse click event, designating the VM in the list of VMs to be a favorite.

11. The method of claim 9, further comprising:
detecting a mouse click event while a cursor is positioned on top of the marker for one of the VMs in the list of VMs; and
designating the one of the VMs in the list of VMs to no longer be a favorite.

12. The method of claim 8, wherein the first criteria is whether or not a VM is running on a specified host.

13. The method of claim 12, wherein each VM in the list of VMs has one of the following: an associated icon indicating whether the corresponding VM is powered on or halted, or a lack of the associated icon indicating that the corresponding VM is powered off.

14. The method of claim 8, wherein the second criteria is whether or not a VM is powered off.

15. The method of claim 8, wherein the second criteria is whether or not the VM is powered on.

16. A non-transitory computer readable storage medium storing instructions to be executed in a processing unit of a computer system, wherein the instructions when executed in the processing unit generates a graphical user interface, the graphical user interface comprising:
a first list of virtual machines (VMs), each VM in the first list of VMs runs locally in the computer system; and
a second list of VMs, each VM in the second list of VMs runs remotely in one or more remote computer systems; and
wherein each VM listed in the first list of VMs and each VM listed in the second list of VMs is displayed with an indication of an associated host machine in which the corresponding VM has been initialized;
wherein the graphical user interface further comprises a search interface into which a search criteria can be inputted to cause only VMs that meet the search criteria to be included in an updated display of the first list of VMs and the second list of VMs, wherein the search interface includes a set of search targets, wherein the updated display of the first list of VMs and the second list of VMs is further updated based on a detected VM state update event; and
wherein the graphical user interface further comprises a second graphical user interface provided by an operating system of a VM selected from the first list of VMs or from the second list of VMs, the second graphical user interface being separate from the search interface, the second graphical user interface enabling a user to interact with the operating system for the selected VM.

17. The non-transitory computer readable storage medium of claim 16, wherein the graphical user interface further comprises a marker on or near VMs that meet a predefined criteria.

18. The non-transitory computer readable storage medium of claim 17, wherein the predefined criteria is whether or not a VM has been designated as a favorite.

19. The non-transitory computer readable storage medium of claim 17, wherein the predefined criteria is whether or not a VM is powered off.

20. The non-transitory computer readable storage medium of claim 19, wherein each VM that has not been powered off has an associated icon indicating whether the corresponding VM is powered on or halted.

21. The non-transitory computer readable storage medium of claim 16, wherein the second graphical user interface enables the user to interact with the operating system for the selected VM by transmitting graphical user interface (GUI) events including mouse movements to the operating system for the selected VM, wherein the operating system for the selected VM responds to the GUI events.

22. The non-transitory computer readable storage medium of claim 21, wherein the search interface displays an icon associated with a search target after the search target has been selected using the shortcut menu.

23. The non-transitory computer readable storage medium of claim 22, wherein the icon and a background of the selected search target are displayed in the search interface in a same color.

24. The non-transitory computer readable storage medium of claim 21, wherein the drop down shortcut menu of search targets includes search targets comprising favorite VMs and powered on VMs.

* * * * *